US006891808B2

(12) United States Patent
Ishii

(10) Patent No.: US 6,891,808 B2
(45) Date of Patent: May 10, 2005

(54) SPANNING TREE BRIDGE AND ROUTE CHANGE METHOD USING THE SAME

(75) Inventor: Shoji Ishii, Atsugi (JP)

(73) Assignee: Anritsu Corporation, Tokyo (JP)

( * ) Notice: Subject to any disclaimer, the term of this patent is extended or adjusted under 35 U.S.C. 154(b) by 776 days.

(21) Appl. No.: 09/799,391

(22) Filed: Mar. 5, 2001

(65) Prior Publication Data
US 2001/0021177 A1 Sep. 13, 2001

(30) Foreign Application Priority Data

Mar. 10, 2000 (JP) ........................................ 2000-067073

(51) Int. Cl.[7] ............................................. H04L 12/56
(52) U.S. Cl. ...................... 370/256; 370/401; 370/408; 209/239
(58) Field of Search ............................... 370/216, 225, 370/228, 254, 255, 256, 401, 408; 709/239

(56) References Cited

U.S. PATENT DOCUMENTS

| | | | | |
|---|---|---|---|---|
| 5,790,808 A | * | 8/1998 | Seaman ...................... | 709/223 |
| 6,032,194 A | * | 2/2000 | Gai et al. .................... | 709/239 |
| 6,202,114 B1 | * | 3/2001 | Dutt et al. .................. | 710/311 |
| 6,219,739 B1 | * | 4/2001 | Dutt et al. .................. | 710/311 |
| 6,262,977 B1 | * | 7/2001 | Seaman et al. ............. | 370/256 |
| 6,330,229 B1 | * | 12/2001 | Jain et al. .................... | 370/256 |
| 6,611,502 B1 | * | 8/2003 | Seaman ...................... | 370/256 |
| 6,628,661 B1 | * | 9/2003 | Goldman et al. ........... | 370/408 |

OTHER PUBLICATIONS

ISO/IEC 15802-3; 1998 (E) ANSI/IEEE Std. 802. 1D, 1998 Edition, Local and Metropolitan Area Networks: Media Access Control (MAC) Bridges, pp. 58-75. The Spanning Tree Algorithm and Protocol.

* cited by examiner

Primary Examiner—John Pezzlo
Assistant Examiner—Dmitry Levitan
(74) Attorney, Agent, or Firm—Frishauf, Holtz, Goodman & Chick, P.C.

(57) ABSTRACT

A controller changes a blocked port to a forwarding state when a link down or change of the representative bridge is detected and a receiving port of a bridge settled in the root bridge is a blocked port. When the bridge itself is not settled in a root bridge, a transmitter transmits to another bridge a TCN-BPDU that, when the bridge itself has received a BPDU inferior to itself BPDU, the representative bridge changes. A transmitter transmits to all other bridges a TC detection flag set BPDU when the bridge itself has received a TCN-BPDU and the bridge itself is settled in a root bridge. When the bridge itself is not settled in a root bridge and the bridge itself has received the TC detection flag set BPDU, such BPDU is transmitted in a direction other than root bridge direction, and the contents of a forwarding table of the bridge itself are deleted.

8 Claims, 6 Drawing Sheets

SPANNING TREE BRIDGE AND ROUTE CHANGE METHOD USING THE SAME

CROSS-REFERENCE TO RELATED APPLICATIONS

This application is based upon and claims the benefit of priority from the prior Japanese Patent Application No. 2000-067073, filed Mar. 10, 2000, the entire contents of which are incorporated herein by reference.

BACKGROUND OF THE INVENTION

The present invention relates to a spanning tree bridge and a route change method using the bridge. In particular, the present invention relates to a spanning tree bridge employed in a network containing a redundant route caused by a plurality of bridges and a route change method using the bridge.

In a network containing a redundant route caused by a plurality of bridges, a spanning tree protocol is employed for determining a route.

For example, as shown in FIG. 7, assume a network over which LAN 1 and LAN 2 are connected to each other by means of a bridge A.

Here, in the case of a network over which node "n1" such as personal computer is connected to LAN 1, and HUB 1 is connected to LAN 2, packets transmitted from the node "n1" are transmitted to all nodes of a broadcast domain including node "n2" such as personal computer connected to the HUB 1 via LAN 1→bridge A→LAN 2→HUB 1.

Over such network, when HUB 2 is connected to LAN 1 and LAN 2 in parallel to bridge A, a packet transmitted from the node "n1" loops over the network like LAN 1→bridge A→LAN 2→HUB 2→LAN 1→bridge A→LAN 2→HUB 2. As a result, a packet cannot be transmitted from a node other than node "n1" (node in a broadcast domain other than node "n1").

In the case where a network is configured by only bridge A and HUB 1 as shown in FIG. 7, a spanning tree is employed to prevent a packet transmitted from a node from looping over the network.

In addition, as shown in FIG. 8, in the case where two bridges A and B are connected in parallel between LAN 1 to which node "n1" such as personal computer is connected and LAN 2 to which HUB 1 is connected, thereby making communication among nodes "n2", "n3", "n4", . . . such as personal computers connected to node "n1" and HUB 1, one bridge is generally used to make communication. When this bridge A is linked down, the other bridge B is used to make communication, whereby a spanning tree is employed in order to cause a network to provide redundancy.

Here, basic algorithm and protocol of the spanning tree consists of the following items (1) to (5) (Refer to ISO/IEC 15802-3: 1998 (E) ANSI/IEEE Std 802. 1D, 1998 Edition, LOCAL AND METROPOLITAN AREA NETWORKS: MEDIA ACCESS CONTROL (MAC) BRIDGES, pp. 58–75, 8. the Spanning Tree Algorithm and Protocol).

(1) A special frame called Configuration Bridge Protocol Data Units (hereinafter, referred to as BPDU) is exchanged between bridges.

The following works are performed based on this exchanged BPDU.

(2) A network root bridge is selected.

Only one root bridge exists in the entire LAN bridge connected.

(3) Each bridge computes the shortest route that reaches a root bridge (A port that provides the shortest route to the root bridge is called a root port).

(4) With respect to each LAN, a "designated bridge" is selected from a bridge connected to the LAN.

(5) Each bridge selects a port (designated port) that belongs to a spanning tree and a port (blocked port) that does not belong to such spanning tree.

All data frames received at a blocked port are discarded.

In addition, frame transmission from a blocked port is not performed at all.

A received BPDU is not forwarded at all.

A data portion of the above mentioned BPDU includes at least root ID, bridge ID, and root path cost.

Root ID is an ID of a root bridge (or a bridge assumed to be such root bridge), and is generated based on a MAC address of such bridge and a priority designated by an administrator.

Bridge ID is an ID of a bridge that transmits a BPDU, and is generated based on a MAC address of such bridge and a priority designated by an administrator.

A root path cost is a cost of the (possible) shortest route from a bridge that transmits a BPDU to a root bridge.

In an initial state (when a power is supplied), each bridge is a root bridge itself, and it is assumed that a root path cost is 0.

Each bridge transmits the initial value of a BPDU to all ports, and at the same time, receives the BPDU transmitted from another bridge from all the ports.

In the case where a bridge has received a better BPDU from a port, such bridge stops transmission of BPDU to that port, and then, changes the value of the BPDU to be transmitted by the bridge itself.

In this manner, in the case where a spanning tree enters a stable state, only one bridge transmits a BPDU among each LAN.

For example, in the case where BPDU 1 and BPDU 2 are present, it is judged which of the above BPDUs is better in accordance with rules (1) to (4) below.

(1) In the case where root ID of BPDU 1 is numerically smaller than that of BPDU 2, it is judged that BPDU 1 is better than BPDU 2.

(2) In the case where root ID of BPDU 1 is numerically equal to that of BPDU 2, if a root path cost of BPDU 1 is smaller than that of BPDU 2, it is judged that BPDU 1 is better than BPDU 2.

(3) In the case where root ID of BPDU 1 is numerically equal to that of BPDU 2, and a root path cost of BPDU 1 is equal to that of BPDU 2, if bridge ID of BPDU 1 is numerically smaller than that of BPDU 2, it is judged that BPDU 1 is better than BPDU 2.

(4) In the case where root ID of BPDU 1 is numerically equal to that of BPDU 2, a root path cost of BPDU 1 is equal to that of BPDU 2, and bridge ID of BPDU 1 is numerically equal to that of BPDU 2, if port ID of BPDU 1 is smaller than that of BPDU 2, it is judged that BPDU 1 is better than BPDU 2.

Then, each bridge compares the initial value of its own BPDU with that of the BPDU from another bridge received from all ports, and selects root ID from the best BPDU.

Next, each bridge computes its own root path cost in accordance with (root path cost)=(root path cost in the best BPDU)+path cost.

A path cost is a cost to the root that each port individually has, and the value of the cost can be set by an administrator.

Once a root ID, a root port, and a root path cost are defined, each bridge updates the content of BPDU transmitted by such each bridge itself.

Further, its own updated BPDU is compared with BPDU received from a port other than root port, and it is judged whether or not each port other than root port is a designated bridge itself.

A port that is a designated bridge is called a designated port, and a port that is not a designated bridge is called a blocked port.

In BPDU transmission and data frame forwarding to a root port, a designated port and a blocked port, a data frame is forwarded at the root port without transmitting BPDU; BPDU is transmitted, and a data frame is forwarded at the designated port; and BPDU is not transmitted, and a data frame is not forwarded at the blocked port.

In this manner, once a spanning tree is configured, each bridge performs regular operations described in (1) to (4) below.

These regular operations are required for reconfiguring a spanning tree that has been configured due to a bridge fault or addition of new bridge.

(1) BPDU includes an element called "message age".

This value denotes an elapsed time after a root bridge has generated a BPDU that corresponds to the above BPDU.

(2) A root bridge transmits its own BPDU periodically to all ports. At this time, "message age" is set to 0.

(3) Each bridge stores a received BPDU, and increases the value of the "message age" of the BPDU stored in each port with an elapse of time (message age timer).

(4) A bridge other than root bridge transmits its own BPDU when it receives a BPDU from a root port.

At this time, as a value of the "message age", there is used a value equal to or greater than the "message age" of the root port and greater than the "message age" of the received BPDU.

Here, the reconfiguration of the spanning tree occurs in any of the cases described in (1) and (2) below.

(1) In the case where the "message age" timer of the stored BPDU times out (in the case where a max age is exceeded); or (2) In the case where a BPDU better than that stored in a port or a BPDU with the small value of the message age is received from the same port.

In the case where any of the above events occurs, a bridge performs re-computation for a root ID, a root cost, and a root port.

In the meantime, it is very dangerous to perform data frame transmission before all the bridges over a network enters a normal state after configuration (reconfiguration) of a spanning tree has been started.

This is because there is a possibility that a temporary loop occurs during spanning tree configuration.

Therefore, even if each bridge determines its own designated port, it does not start data frame forwarding immediately.

There are three types of the states of each port in a bridge:

(1) listening: No work concerning a data frame is carried out.

(2) learning: Although the learning of a starting MAC address is performed, forwarding is not performed.

(3) forwarding: Data frame forwarding is performed.

The lengths of the listening state and learning state are called a "forward delay". A root bridge determines its value, enters its value in a BPDU, and transmits the fact to each bridge.

In addition, a timer employed in the listening state and learning state is called a "forwarding timer".

If spanning tree reconfiguration occurs, a host position changes, and the contents of an old learning table may be incorrect.

Thus, the bridge corresponding to a spanning tree has two kinds of states as timeout values of the learning table aging timer as follows.

(1) Normal value: This value is set to a long time such as a few minutes.

(2) A value used after topology change: This value is the same as the forward delay value.

When a bridge senses spanning tree reconfiguration, the timeout value of the learning table aging timer is set to a value identical to forward delay for a predetermined period of time.

In the meantime, a spanning tree algorithm and protocol has a system that notifies to all bridges that spanning tree reconfiguration has occurred.

(1) When a bridge senses a topology change, that bridge transmits a frame called TCN-BPDU (Topology Change Notification BPDU) to a root port with hello time intervals.

This transmission is continued until a BPDU in which a TCA (Topology Change Acknowledgment) flag is set has been received from the root port.

(2) A bridge which has received TCN-BPDU also transmits TCN-BPDU to its own root port.

On the other hand, to a port that has received a TCN-BPDU, a BPDU TCA flag is set, and a BPDU is transmitted during transmission of the next BPDU.

(3) In the case where a root bridge receives a TCN-BPDU or the state of its own port changes, the root bridge transmits a BPDU in which a TC (Topology Change) flag is set from that time to a max age + forward delay time.

(4) A bridge which has received the TC flag set BPDU from a root port sets a TC flag for its own BPDU, and transmits such BPDU.

This transmission is continued until a BPDU in which a TC flag is not set has been received.

(5) While a bridge receives TC flag set BPDU from the root port, the bridge uses the value of "forward delay" as a timeout value of the learning table aging timer.

In this way, a spanning tree has an algorithm for automatically removing a loop in a redundant bridge network, and automatically sensing a network topology change caused by a device fault or cable failure, thereby automatically changing a network topology so as to prevent a loop from being produced.

In the meantime, such spanning tree works so as not to form a loop in a network. However, in the case where a root port is linked down for any reason (such as cable reconnection, invalid port setting or communication route change caused by a communication failure, for example), an operation for restoring a blocked port that has stopped and reconfiguring a spanning tree is executed.

FIG. 9 shows an example of a network describing such operation.

In the network shown in FIG. 9, assume that three bridges A, B and C are connected to each other, and a spanning tree is configured so that, in a normal state, communication can be made when bridge A is defined as a root bridge, bridge B is defined as a representative bridge, and a port of bridge C oriented to the bridge B is defined as a blocked port.

With respect to the nodes connected to each bridge, only portions required for illustration is illustrated, and the other portion is omitted.

In the network shown in FIG. 9, in the case of making communication between node "n1" connected to bridge B and node "n2" connected to bridge C, a signal from the node "n1" of bridge B is transmitted to node "n2" of bridge C through bridges A and C.

If communication is disabled between bridges A and B for any reason, communication between node "n1" connected to bridge B and node "n2" connected to bridge C is also disabled. Thus, it is required to open a blocked port of bridge C, and change a communication route, thereby reconfiguring a spanning tree.

In a conventional spanning tree, if communication is disabled between bridges A and B, bridge B does not receive a BPDU periodically transmitted from bridge A that is a root bridge.

In this manner, when bridge B does not receive the BPDU for a predetermined time, bridge B detects a network failure relevant to bridge A.

When bridge B detects a network failure, a BPDU is not transmitted from bridge B to bridge C.

In this manner, bridge C does not receive a BPDU essentially transmitted via bridges A and B.

When bridge C starts an operation for gradually opening a blocked port so as to enable communication between bridges B and C after an elapsed time from a time when a BPDU is not received from bridge B has elapsed a predetermined designated time.

When a blocked port of bridge C fully opens, communication between a node connected to bridge B and a node connected to bridge C is enabled.

However, in such conventional technique of reconfiguring a spanning tree, there has been a problem that, after a network failure has been detected, a certain time is required for opening such blocked port to enable communication between node "n1" connected to bridge B and node "n2" connected to bridge C; and restoration from a communication interrupt is slow, which causes lowered communication efficiency.

BRIEF SUMMARY OF THE INVENTION

The present invention has been made in order to solve the foregoing problem. It is an object of the present invention to provide a spanning tree bridge capable of taking action immediately even in the case where a communication route change occur, and speeding up restoration from a communication interrupt.

In order to achieve the foregoing object, according to a first aspect of the present invention, there is provided a spanning tree bridge having the same algorithm and protocol each other, one of which is employed in a network containing a redundant route caused by a plurality of bridges settled in a root bridge, the spanning tree bridge comprising:

first detection means for detecting a link down of a root port that provides a shortest route to the root bridge;

second detection means for detecting a change of a representative bridge of a receiving port from information on Configuration Bridge Protocol Data Units (hereinafter, referred to as a BPDU) received from another bridge;

means for, when the first detection means detects a link down of the root port, settling the spanning tree bridge itself in a root bridge;

means for, in the case where a receiving port of spanning tree bridge settled in the root bridge is a blocked port, when the first detection means detects a link down of the root port or when the second detection means detects a change of the representative bridge, changing the blocked port to a forwarding state;

means for, in the case where the spanning tree bridge itself is not settled in a root bridge, when the spanning tree bridge that is not settled in the root bridge receives a BPDU from a representative port of a representative bridge of a received port inferior to its own BPDU, transmitting to the other bridge a Topology Change Notification BPDU (hereinafter, referred to as a TCN-BPDU) that the representative bridge changes;

means for, in the case where the spanning tree bridge itself is settled in a root bridge, when the spanning tree bridge itself settled in the root bridge receives a TCN-BPDU from another bridge, transmitting to all other bridges a BPDU in which Topology Change (hereinafter, referred to TC) detection flag is set; and means for, in the case where the spanning tree bridge itself is not settled in a root bridge, the spanning tree bridge itself that is not settled in the root bridge receives a BPDU in which the TC detection flag is set, transmitting the BPDU in a direction other than root bridge direction, and deleting the content of a forwarding table of the spanning tree bridge itself that is not settled in the root bridge.

In order to achieve the foregoing object, according to a second aspect of the present invention, there is provided a spanning tree bridge having the same algorithm and protocol each other, one of which is employed in a network containing a redundant route caused by a plurality of bridges settled in a root bridge, the spanning tree bridge comprising:

first detection means for detecting a link down of a root port that provides a shortest route to the root bridge;

second detection means for detecting a change of a representative bridge of a receiving port from information on Configuration Bridge Protocol Data Units (hereinafter, referred to as a BPDU) received from another bridge;

means for, when the first detection means detects a link down of the root port or when the second detection means detects a change of the representative bridge, settling the spanning tree bridge itself in a root bridge;

means for, in the case where a receiving port of spanning tree bridge settled in the root bridge is a blocked port, when the first detection means detects a link down of the root port or when the second detection means detects a change of the representative bridge, changing the blocked port to a forwarding state;

means for, in the case where the spanning tree bridge itself is not settled in a root bridge, when the spanning tree bridge that is not settled in the root bridge receives a BPDU from a representative port of a representative bridge of a received port inferior to its own BPDU, transmitting to the other bridge a Topology Change Notification BPDU (hereinafter, referred to as a TCN-BPDU) that the representative bridge changes;

means for, in the case where the spanning tree bridge itself is settled in a root bridge, when the spanning tree bridge itself settled in the root bridge receives a TCN-BPDU from another bridge, transmitting to all other bridges a BPDU in which Topology Change (hereinafter, referred to TC) detection flag is set; and means for, in the case where the spanning tree bridge itself is not settled in a root bridge, the spanning tree bridge itself that is not settled in the root bridge receives a BPDU in which the TC detection flag is set, transmitting the BPDU in a direction other than root bridge direction, and deleting the content of a forwarding table of the spanning tree bridge itself that is not settled in the root bridge.

In addition, in order to achieve the foregoing object, according to a third aspect of the present invention, there is provided a spanning tree bridge according to the second aspect, further comprising means for, when the second detection means detects a change of the representative bridge, and when the spanning tree bridge settled in a root bridge receives a BPDU from another bridge superior to its own BPDU, setting the spanning tree bridge itself free of being settled in the root bridge.

In addition, in order to achieve the foregoing object, according to a fourth aspect of the present invention, there is provided a spanning tree bridge according to the second aspect, further comprising means for, when the second detection means detects a change of the representative bridge, in the case where a port which has detected a change of the representative bridge is a root port, settling the spanning tree bridge itself in a root bridge, and in the case where a port which has detected a change of the representative bridge is not a root port, setting the spanning tree bridge free of being settled in the root bridge.

In order to achieve the foregoing object, according to a fifth aspect of the present invention, there is provided a spanning tree bridge route change method having the same algorithm and protocol each other, one of which is employed in a network containing a redundant route caused by a plurality of bridges settled in a root bridge, the method comprising the steps of:

detecting a link down of a root port that provides a shortest route to the root bridge;

detecting a change of a representative bridge of a receiving port from information on Configuration Bridge Protocol Data Units (hereinafter, referred to as a BPDU);

when a link down of the root port is detected, settling the spanning tree bridge itself in a root bridge;

in the case where a receiving port for a spanning tree bridge settled in the root bridge is a blocked port, when a link down of the root port is detected or when a change of the representative bridge is detected, changing the blocked port to a forwarding state;

in the case where the spanning tree bridge itself is not settled in a root bridge, when the spanning tree bridge itself that is not settled in the root bridge receives a BPDU from a representative port of a representative bridge of a received port inferior to its own BPDU, transmitting to the other bridge a Topology Change Notification BPDU (hereinafter, referred to as a TCN-BPDU) that the representative bridge changes;

in the case where the spanning tree bridge itself is settled in a root bridge, when the spanning tree bridge itself settled in the root bridge receives a TCN-BPDU from another bridge, transmitting to all other bridges a BPDU in which a Topology Change (hereinafter, referred to as a TC) detection flag is set; and in the case where the spanning tree bridge itself is not settled in a spanning tree, when the spanning tree bridge itself that is not settled in the root bridge receives a BPDU in which the TC detection flag is set, transmitting the BPDU in a direction other than root bridge direction, and deleting the content of a forwarding table of the spanning tree bridge itself that is not settled in the root bridge.

In order to achieve the foregoing object, according to a sixth aspect of the present invention, there is provided a spanning tree bridge route change method having the same algorithm and protocol each other, one of which is employed in a network containing a redundant route caused by a plurality of bridges settled in a root bridge, the method comprising the steps of:

detecting a link down of a root port that provides a shortest route to the root bridge;

detecting a change of a representative bridge of a receiving port from information on Configuration Bridge Protocol Data Units (hereinafter, referred to as a BPDU);

when a link down of the root port is detected or when a change of the representative bridge is detected, settling the spanning tree bridge itself in a root bridge;

in the case where a receiving port for a spanning tree bridge settled in the root bridge is a blocked port, when a link down of the root port is detected or when a change of the representative bridge is detected, changing the blocked port to a forwarding state;

in the case where the spanning tree bridge itself is not settled in a root bridge, when the spanning tree bridge itself that is not settled in the root bridge receives a BPDU from a representative port of a representative bridge of a received port inferior to its own BPDU, transmitting to the other bridge a Topology Change Notification BPDU (hereinafter, referred to as a TCN-BPDU) that the representative bridge changes;

in the case where the spanning tree bridge itself is settled in a root bridge, when the spanning tree bridge itself settled in the root bridge receives a TCN-BPDU from another bridge, transmitting to all other bridges a BPDU in which a Topology Change (hereinafter, referred to as a TC) detection flag is set; and in the case where the spanning tree bridge itself is not settled in a spanning tree, when the spanning tree bridge itself that is not settled in the root bridge receives a BPDU in which the TC detection flag is set, transmitting the BPDU in a direction other than root bridge direction, and deleting the content of a forwarding table of the spanning tree bridge itself that is not settled in the root bridge.

In addition, in order to achieve the foregoing object, according to a seventh aspect of the present invention, there is provided a spanning tree bridge route change method according to the sixth aspect, the route change method comprising the step of:

when a change of the representative bridge is detected, when the spanning tree bridge itself settled in a root bridge receives a BPDU from another bridge superior to its own BPDU, setting the spanning tree bridge itself free of being settled in the root bridge.

In addition, in order to achieve the foregoing object, according to a eighth aspect of the present invention, there is provided a spanning tree bridge route change method according to the sixth aspect, the route change method further comprising the step of:

when a change of the representative bridge is detected, in the case where a port which has detected a change of the representative bridge is a root port, settling the spanning tree bridge itself in a root bridge, and in the case where a port which has detected a change of the representative bridge is not a root port, setting the spanning tree bridge itself free of being settled in the root bridge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
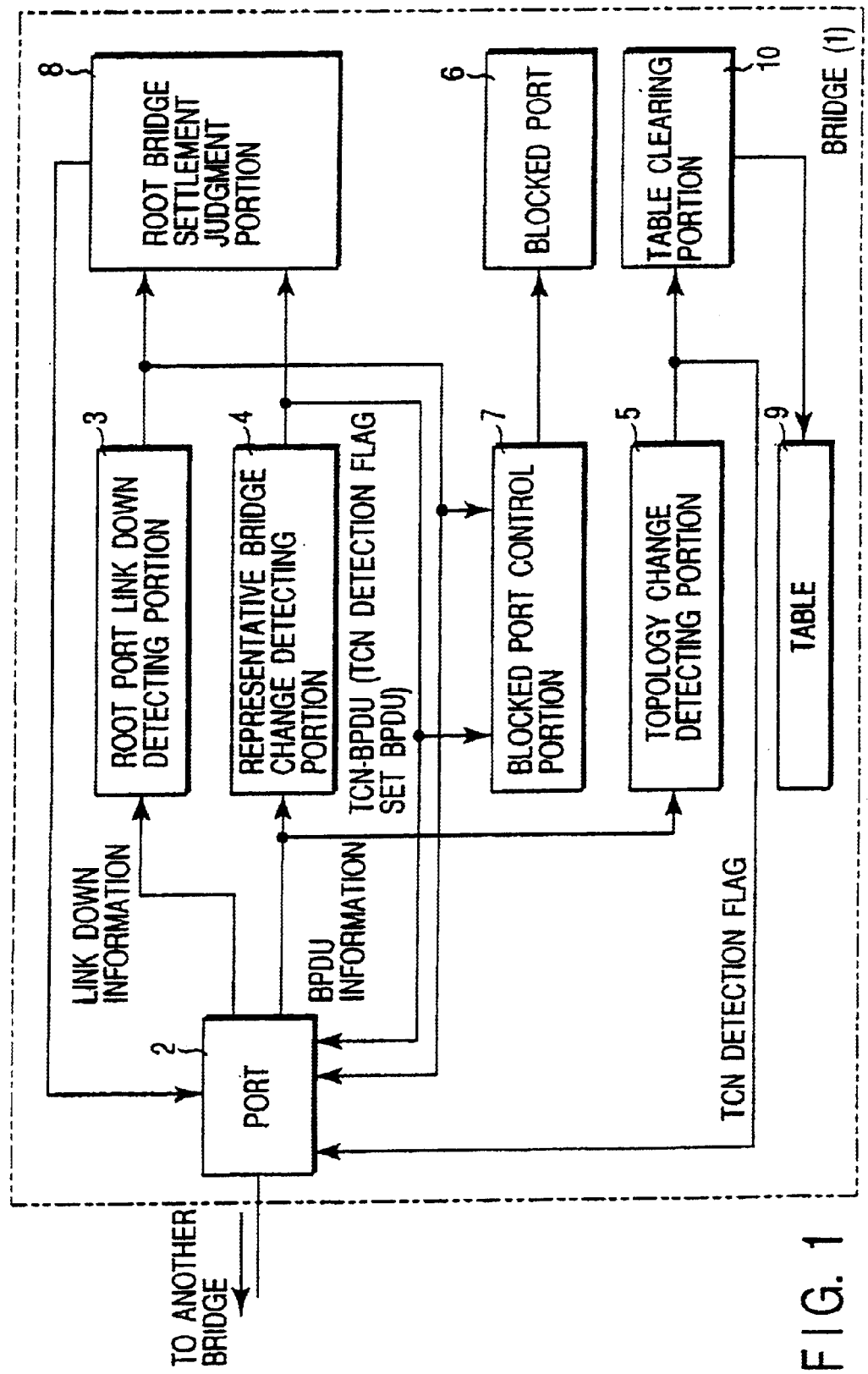
FIG. 1 is a functional block diagram depicting a configuration of a spanning tree bridge according to the present invention.

Reference will now be made in detail to the presently preferred embodiments of the invention as illustrated in the accompanying drawings, in which like reference numerals designate line or corresponding parts.

FIG. 1 is a functional block diagram schematically illustrating an internal configuration of a spanning tree bridge according to the present invention.

As shown in FIG. 1, a spanning tree bridge 1 comprises: a port 2 connected to another bridge; a link down detecting portion 3; a representative bridge change detecting portion 4; a topology change detecting portion 5; a blocked port 6; a blocked port control portion 7; a root bridge settlement judgment portion 8; a table 9; and a table clearing portion 10.

The representative bridge used herein denotes a bridge relatively positioned at an upper stage in bridges connected to each other.

First, a BPDU transmitted to and received from bridges will be described with reference to FIG. 2A to FIG. 2C.

Figure 2A:
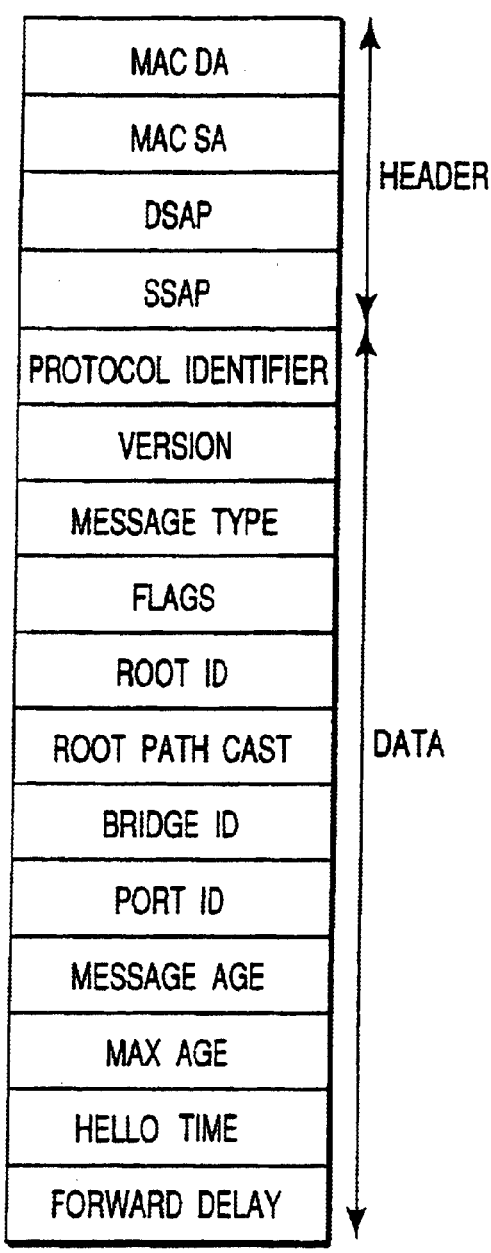
FIG. 2A is a view showing a frame format of a BPDU transmitted to or received from bridges.

FIG. 2A is a view showing a frame format of the BPDU transmitted to and received from bridges.

Figure 2B:
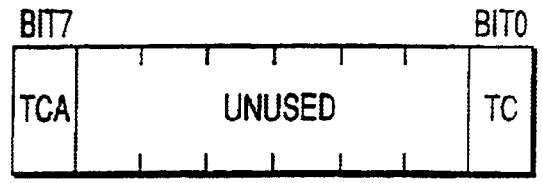
FIG. 2B is a view showing a frame format of a flag contained in BPDU data.

FIG. 2B is a view showing a frame format of a flag contained in BPDU data.

Figure 2C:
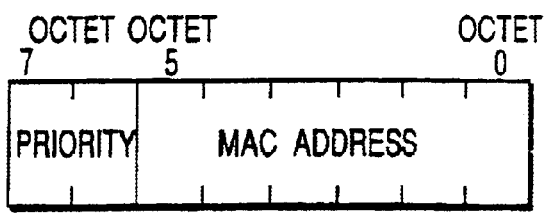
FIG. 2C is a view showing a frame format of root ID, bridge ID contained in BPDU data.

FIG. 2C is a view showing a frame format of root ID, bridge ID contained in BPDU data.

Figure 2D:
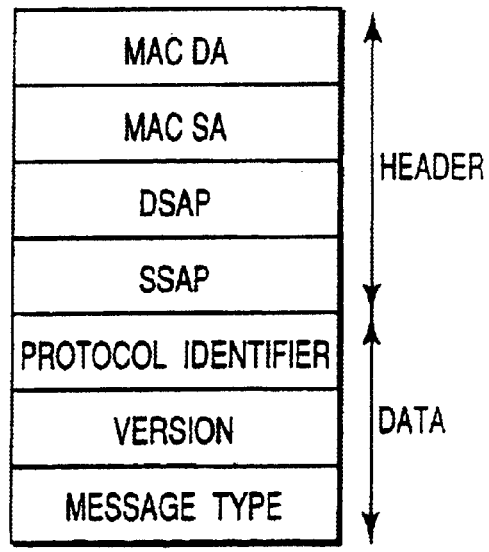
FIG. 2D is a view showing a frame format of a TCN-BPDU transmitted when a topology change is detected.

FIG. 2D is a view showing a frame format of a TCN-BPDU transmitted when a topology change is detected.

First, as shown in FIG. 2A, a BPDU is composed of a header portion and a data portion.

In addition, as shown in FIG. 2B, a flag contained in BPDU data is composed of a TCA, an unused region, and a TC.

Then, a bridge which has received from a root port a BPDU in which a TCA bit is set stops transmission of a TCN-BPDU to the root port.

A bridge which has received from a root port a BPDU in which TC bit is set sets a timeout value of a learning table aging timer to a value of a forward delay until the bridge receives a BPDU in which a TC flag is not set. The bridge itself also transmits a BPDU in which a TC flag is set.

As shown in FIG. 2C, the root ID and bridge ID contained in BPDU data have a priority of which the upper 2 octets are set by an administrator, and the lower 6 octets are a MAC address of the bridge.

Here, with respect to the root ID and bridge ID, the priority of the upper 2 octets set by the administrator precedes any other priority so that the significance of the bridge can be discriminated according to the entire scale including the MAC address.

For example, in the case where the upper 2 octets of the BPDU root ID of each bridge are defaulted, a bridge with its smallest MAC address of root ID is defined as a root bridge.

Otherwise, a root path cost contained in BPDU is the (possible) shortest cost relevant to a root.

In addition, the port ID contained in BPDU data has a priority of the upper one octet set by the administrator, and the lower 1 octet is an ID specific to the bridge.

The message age contained in BPDU data denotes an elapsed time from a root bridge, and the unit is $1/256$ second.

Therefore, in the case where this value is 256, a root bridge transmits a BPDU that corresponds to this BPDU 1 second earlier.

Further, the max age contained in BPDU data denotes a BPDU effective period, and the unit is $1/256$ second.

Furthermore a hello time contained in BPDU data denotes a time interval for a root bridge to transmit a BPDU, and the unit is $1/256$ second.

That is, a root bridge transmits a BPDU with hello time intervals.

A forward delay contained in BPDU data denotes a parameter used for a learning table aging timer in the case where a listening period, a learning period, or spanning tree reconfiguration occurs, and the unit is $1/256$ second.

A topology change timer (not shown) denotes a timer for measuring a period in which a flag TC is set.

Now, a function that each bridge 1 comprises will be described here.

First, a root port link down detecting portion 3 detects a link down based on information of a port (a root port) in a direction oriented to a root bridge via a port 2.

In more detail, a root port link down detecting portion 3 is conductive when connection between ports is established. This portion detects a link down by way of an interrupt signal generated when disconnection between ports occurs.

This link down detection can be performed by way of polling.

When a bridge 1 thus detects a root port link down, it transmits from a representative port of a port 2 a BPDU (a MAC address of root ID is rewritten into its own address) which asserts that the bridge 1 itself is settled in a root bridge.

In addition, a representative bridge change detecting portion 4 compares BPDU information received from another bridge connected to the bridge 1 with BPDU information of the bridge 1 itself, and detects a change of the representative bridge.

In more detail, the representative bridge change detecting portion 4 compares the root ID in the BPDU received from another bridge with the root ID in the BPDU of the bridge 1 itself. Then, this detecting portion judges that, when the root ID in the BPDU received from another bridge is worse than information on the root ID of the bridge 1 itself, a representative bridge changes.

A topology change detecting portion 5 detects whether or not topology changes in that network.

In more detail, when a bridge 1 detects topology change by means of this topology change detecting portion 5, it transmits the TCN-BPDU shown in FIG. 2D to a root port with hello time intervals.

Another bridge which has received this TCN-BPDU propagates the TCN-BPDU in a root direction immediately. Then, the TCN-BPDU is finally sent to a root bridge via each bridge.

When the root bridge receives the TCN-BPDU, it sets the BPDU flag TC of the root bridge itself. That is, the root bridge sets a TC detection flag, and transmits the BPDU.

A bridge which has received the BPDU in which the TC detection flag is set propagates the BPDU immediately, and sends it to each bridge.

After a root port link down has been detected by the link down detecting portion 3, when it is judged that a representative bridge has changed by the representative bridge change detecting portion 4, in the case where the bridge is originally set at a blocked port in the bridge 1, a blocked port control portion 7 performs a control for immediately opening such blocked port and changing the port to a forwarding state.

When a root port link down is detected by the root port link down detecting portion 3, a root bridge settlement judgment portion 8 judges whether or not the bridge 1 detecting this link down is settled in a root bridge.

In addition, when the root bridge settlement judgment portion 8 judges that a representative bridge has been changed by the representative bridge change detecting portion 4, it judges whether or not a bridge detecting a change of this representative bridge is settled in a root bridge.

In the case where the bridge 1 settled in the root bridge according to judgment of the root bridge settlement judgment portion 8 has received from another bridge a BPDU better than the bridge 1 itself settled in the root bridge, the root bridge settlement judgment portion 8 releases the bridge 1 settled in the root bridge from its settlement.

In addition, when the representative bridge change detecting portion 4 detects a change of the representative bridge, the root bridge settlement judgment portion 8 settles the spanning tree bridge 1 itself in a root bridge in the case where a port detecting a change of the representative bridge is a root bridge. This detecting portion sets the spanning tree bridge 1 itself free of being settled in the root bridge in the case where a port detecting the representative bridge is not a root bridge.

When a forwarding table clearing portion 10 detects a TC detection flag set by the topology change detecting portion 5, it deletes the contents (database information) of the forwarding table 9.

In more detail, when a BPDU in which a TC detection flag is set is received from a root bridge by means of the topology change detecting portion 5, database information contained in the forwarding table 9 is deleted.

This function does not operate during a topology change timer period after the function has operated.

Now, an operation of bridges each configured above will be described with reference to FIG. 3 and FIG. 4.

Figure 3:
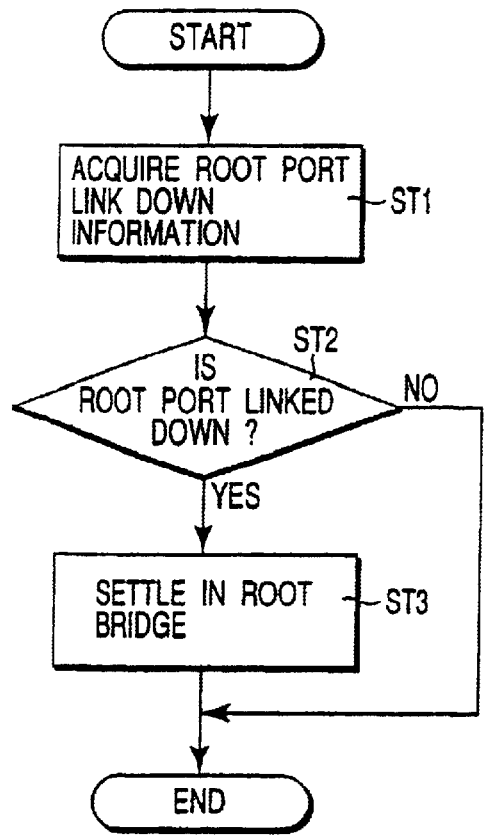
FIG. 3 is a flow chart illustrating a link down detecting operation of a root port using a spanning tree bridge shown in FIG. 1.

FIG. 3 is a flow chart illustrating a root port link down detecting operation using a spanning tree bridge shown in FIG. 1.

Figure 4:
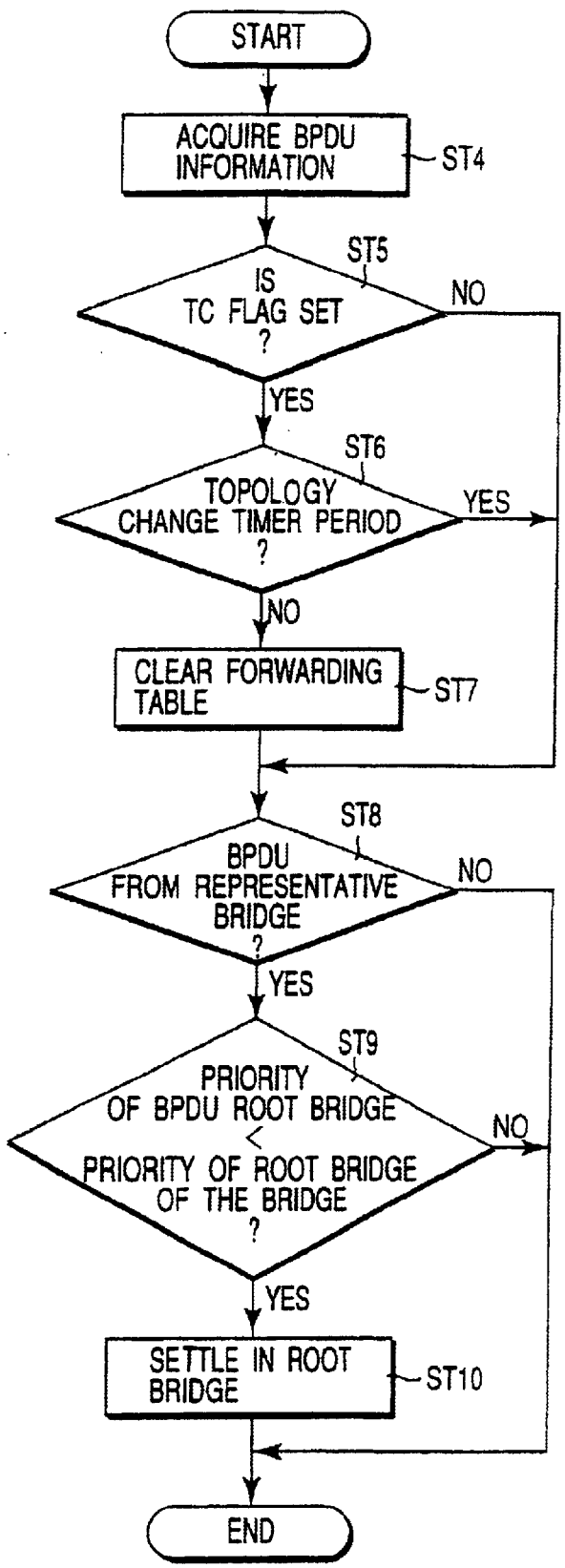
FIG. 4 is a flow chart illustrating an operation for receiving a BPDU from another bridge in a network using the spanning tree bridge shown in FIG. 1.

FIG. 4 is a flow chart illustrating a BPDU receiving operation from another bridge in a network using the spanning tree bridge shown in FIG. 1.

As shown in shown in FIG. 3, when a root port link down is detected, if root port link down information is acquired (step ST1), it is judged whether or not a link down port is a root port from the acquired link down information (step ST2).

When it is judged that the link down port is a root port, the bridge 1 is settled in a root bridge (step ST3).

As shown in FIG. 4, when the BPDU information is acquired by receiving a BPDU from another bridge (step ST4), it is judged whether or not the TC flag of the acquired BPDU information is set (step ST5).

When it is judged that the TC flag is not set, operation at the step ST8 described later is executed.

In contrast, when it is judged that the TC flag is set, it is judged whether or not a topology change timer period is established (step ST6).

If it is judged that such topology time period is not established, operation at the step ST8 described later is executed.

In contrast, when it is judged that the topology timer period is established, a forwarding table 9 stored in storage means of the bridge 1 itself is cleared, whereby the database information is deleted (step ST7).

When the contents of the forwarding table are cleared, it is judged whether or not the BPDU obtained at the step ST4 is a BPDU from a representative bridge (step ST8).

When it is judged that the obtained BPDU is not a BPDU from the representative bridge, processing terminates intact.

In contrast, when it is judged that the obtained BPDU is a BPDU from the representative bridge, the priority of the root bridge of the obtained BPDU is compared with that of the BPDU of the bridge 1 itself, and it is judged which of these priorities is high (step ST9).

When the priority of the root bridge of the obtained BPDU is equal to or higher than that of the BPDU of the bridge 1 itself, processing terminates intact.

In contrast, when it is judged that the priority of the root bridge of the BPDU of the bridge 1 itself is low, the bridge 1 itself is settled in a root bridge (step ST10).

According to the flow chart shown in FIG. 4, at the step ST6, it is judged whether or not a topology change timer period is established.

Hence, after this operation is skipped, when it is judged that a TC flag is set at the step ST5, the deletion of the contents of the forwarding table 9 may be executed at the step ST7 immediately.

Now, a description will be given to an operation when there occurs cable reconnection, invalid port setting, communication route change caused by a communication failure in a network using the above configured spanning tree bridge 1, whereby a topology change occurs.

Here, a description will be given by exemplifying a network configuration shown in FIG. 5A to FIG. 5E for clarity.

That is, FIG. 5A to FIG. 5E are views each illustrating an operation when disconnection occurs between bridges other than root bridge, and a topology change occurs in a network using the spanning tree bridge shown in FIG. 1.

Figure 5A:
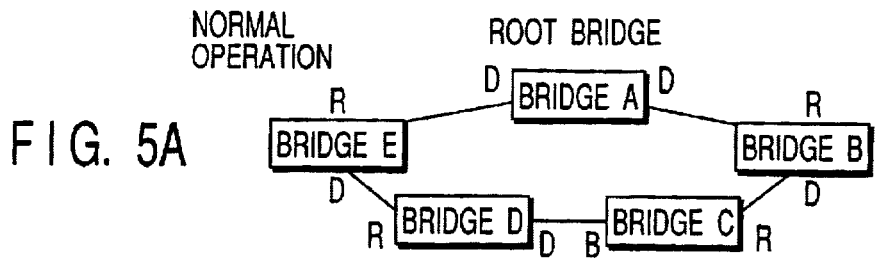
FIG. 5A to FIG. 5E are views each illustrating an operation when disconnection between bridges other than root bridge is made in a network using the spanning tree bridge shown in FIG. 1, and a topology change occurs.

FIG. 5A is a view showing that connection among bridges A, B, C, D and E is in a normal state.

FIG. 5B to FIG. 5E are views each showing data exchange during a topology change when disconnection between bridges D and E of the bridges A to E has been made.

In FIG. 5A to FIG. 5E, reference sign R assigned to each of the bridges A–E denote a root port.

Reference sign D denotes a representative port.

Reference sign B denotes a blocked port.

In the network shown in FIG. 5A to FIG. 5E, when the normal state shown in FIG. 5A is established, a spanning tree is configured such that bridge A is defined as a root bridge, and a receiving port oriented to bridge D of bridge C is defined as blocked port B.

Figure 5B:
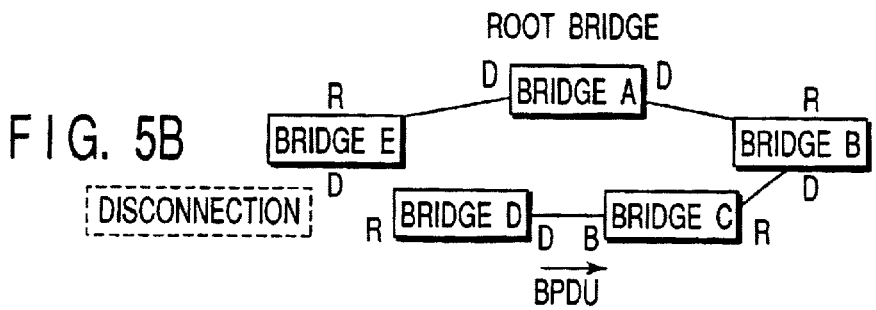

As shown in FIG. 5B, disconnection between root port R of bridge D and representative port D of bridge E disables data communication (excluding BPDU) via bridge C or bridge E.

Thus, in the network using the spanning tree bridge 1 according to the present invention, as described below, a route change is performs such that blocked port B of bridge C is opened to be changed to a forwarding state, whereby an operation for reconfiguring a spanning tree within a short time is executed.

As shown in FIG. 5B, when disconnection between root port R of bridge D and representative port D of bridge E is made, bridge D detects a link down of root port R as described previously, whereby the bridge D itself is temporarily settled in a root bridge.

Then, bridge D transmits the BPDU having root ID changed to the MAc address of the bridge D itself from the representative port D to blocked port B of bridge C.

As shown in FIG. 5, when bridge C receives a BPDU from bridge D, from its blocked port B, it compares BPDU information from the received bridge D with that of the bridge C itself.

As a BPDU of the bridge C itself, bridge C has a BPDU sent via bridge D before disconnecting a loop in which disconnection between root port R of bridge D and representative port D of bridge E is made.

Therefore, bridge C receives a BPDU having root bridge information inferior to root bridge information possessed by blocked port B from representative port D of bridge D that is a representative bridge of blocked port B.

In this manner, bridge C judged that the bridge has received from bridge D a BPDU inferior to a BPDU of the bridge C itself, as shown in FIG. 5B, and the bridge C itself is temporarily settled in a root bridge. In addition, an operation for immediately opening blocked port B of a receiving port which has received such inferior BPDU is performed, whereby blocked port B is defined as representative port D.

In this case, bridge C is not settled in a root bridge as long as the bridge C receives from a representative port via bridge B a BPDU periodically transmitted from bridge A that has been a root bridge before disconnection of the above loop.

Figure 5C:
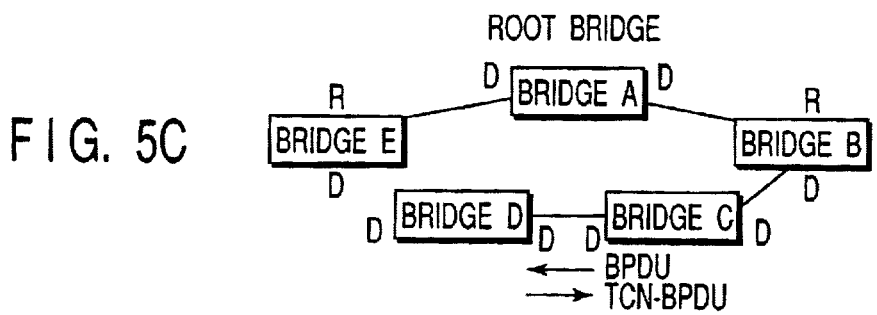

Bridge C transmits a BPDU of the bridge C itself from its representative port D to representative port D of bridge D, as shown in FIG. 5C.

When a BPDU from representative port D of bridge C is received at its representative port D, bridge D compares information on the received BPDU with that of the bridge D itself.

In this case, at bridge D, a BPDU superior to a BPDU of the bridge D itself is received at its representative port D. Thus, root bridge settlement is released, thereby disabling a root bridge.

Then, bridge D transmits a TCN-BPDU from its representative port D to representative port D of bridge C.

Figure 5D:
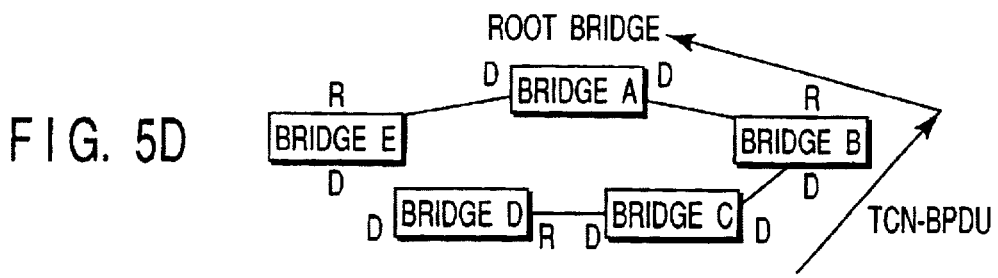

When a TCN-BPDU from bridge D is received at its representative port D, bridge C transmits its TCN-BPDU to a representative port of bridge B, as shown in FIG. 5D.

At this time, at bridge C settled in a root bridge, when a BPDU periodically transmitted from bridge A that has been a root bridge before disconnection of the above loop is received at representative port D of the bridge C via bridge B, root bridge settlement is released, thereby disabling a root bridge.

In this manner, bridge A that has been a root bridge before disconnection of the above loop continuously serves as a root bridge.

Further, when bridge B receives a TCN-BPDU from bridge C, from representative port D of the bridge B, it transmits its TCN-BPDU to representative port D of bridge A that is a root bridge.

That is, the TCN-BPDU transmitted from bridge D is transmitted to bridge A that is a root bridge via bridges C and B.

Figure 5E:
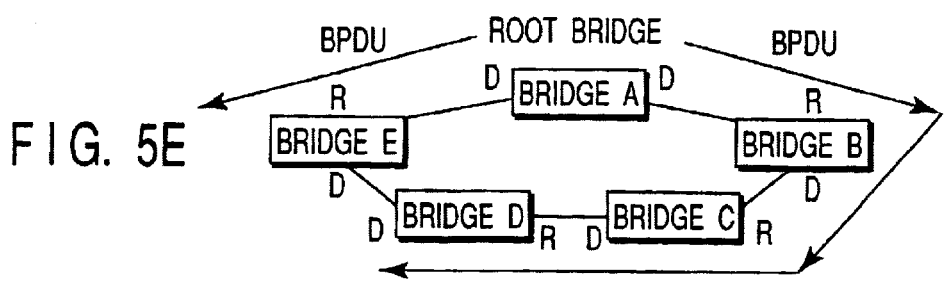

When bridge A receives the TCN-BPDU from bridge B, from representative port D of the bridge B, it transmits the TC detection flag set BPDU to root port R of bridge B and root port R of bridge E, as shown in FIG. 5E, in order to notify to each bridge that a topology changes.

When bridge B receives the TC detection flag set BPDU from bridge A, from root port R of the bridge B, it transmits its BPDU to root port of bridge C.

Further, when bridge C receives the TC detection flag set BPDU from bridge B, from root port R of the bridge C, it transmits its BPDU to root port R of bridge D.

That is, the TC flag set BPDUs transmitted from bridge A that is a root bridge are sequentially propagated to all other bridges B to E.

Then, each of the bridges B, C, D and E which has received the TC detection lag set BPDU deletes the contents of the forwarding table of each of the bridges B, C, D and E itself.

In this manner, each of the bridges B, C, D and E having its own forwarding table deleted therefrom generates a new forwarding table by an automatic learning function for address information that is one of the features of the spanning tree bridge.

That is, when communication is restarted, each bridge automatically learns a port of a bridge connected to a node issuing a packet by referring to the MAC address information of a packet sent, whereby the new forwarding table of each bridge is generated at a time when all the packets each pass through each bridge.

Now, as another example, an operation when disconnection between representative port D of bridge A and root port R of bridge E is made will be described with reference to FIG. 6A to FIG. 6E.

That is, FIG. 6A to FIG. 6E are views each illustrating an operation when disconnection between a root bridge and another bridge is made, and a topology change occurs in a network using the spanning tree bridge 1 shown in FIG. 1.

Figure 6A:
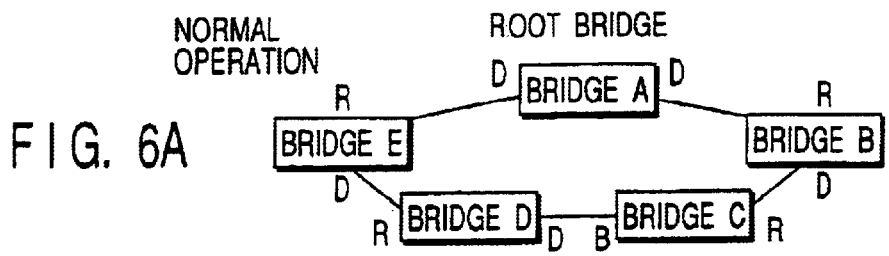
FIG. 6A to FIG. 6E are views each illustrating an operation when disconnection between a root bridge and another bridge is made in a network using the spanning tree bridge shown in FIG. 1, and a topology change occurs.

In the network shown in FIG. 6A to FIG. 6E, as in FIG. 5A, when the normal state shown in FIG. 6A is established, bridge A is defined as a root bridge, a receiving port oriented to bridge D of bridge C is defined as blocked port B, and a spanning tree is configured.

Figure 6B:
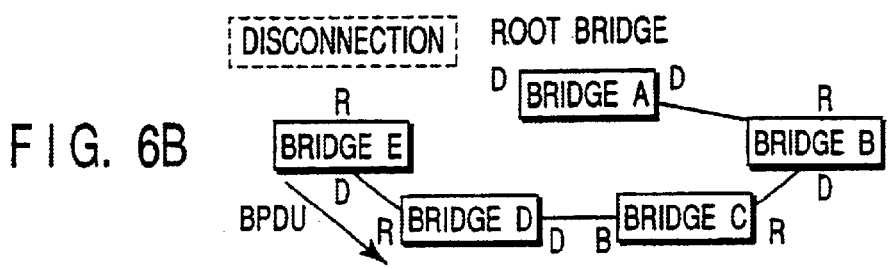

As shown in FIG. 6B, disconnection between representative port D of bridge A and root port R of bridge E disable data communication (excluding BPDU) via bridge C, bridge D or bridge E.

Thus, in the network using the spanning tree bridge 1 according to the present invention, as described below, blocked port B of bridge C is opened immediately to be changed to a forwarding state, and a route change is made, whereby an operation for reconfiguring a spanning tree within a short time is executed.

As shown in FIG. 6B, when disconnection between representative port D of bridge A and root port R of bridge E is made, as described previously, bridge E detects a link down of root port R, and the bridge E itself is temporarily settled in a root bridge.

Then, bridge E transmits a BPDU in which root ID is changed to the MAC address of the bridge E itself, from its representative port D to root port R of bridge D.

When the BPDU from bridge E is received at root port R of the bridge D, bridge D compares information on the BPDU received from the bridge E with that of the bridge D itself.

At bridge D, the BPDU of the bridge D itself is updated by a BPDU sent via bridges B and C from bridge A that has been a root bridge before disconnection of a loop in which disconnection between root port R of bridge E and representative port of bridge A is made.

Therefore, bridge D receives a BPDU having root bridge information inferior to root bridge information possessed by its root port R from the representative port D of the bridge E that is the representative bridge of the root port R of the bridge D.

Figure 6C:
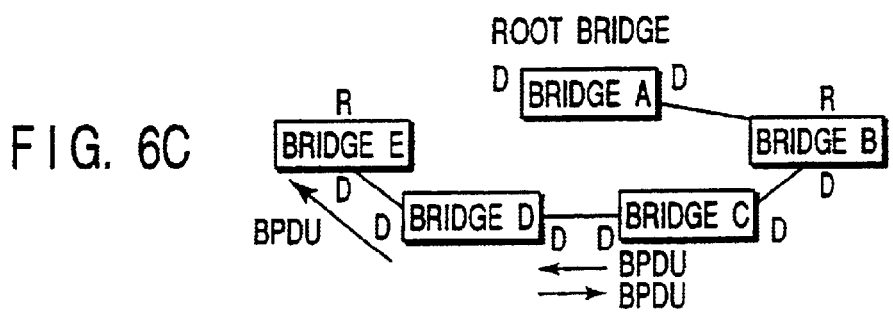

In this manner, bridge D judges that the bridge D has received a BPDU inferior to a BPDU of the bridge D itself from bridge E, and thus, the bridge D itself is temporarily settled in a root bridge. In addition, the bridge D transmits its own BPDU from its representative port D to blocked port B of bridge C, as shown in FIG. 6C.

At this time, bridge D does not perform an operation for opening a port in particular because a receiving port is opened.

In addition, at the same time, bridge D transmits its own BPDU from representative port D to representative port D of bridge E.

When the BPDU from bridge D is received at its representative port D, bridge E compares information on the BPDU received from this bridge D with that of the bridge E itself.

In this case, bridge E judges that the BPDU superior to the BPDU of the bridge E itself has been received at its representative port D. Thus, root bridge settlement is released, thereby disabling a root bridge.

As shown in FIG. 6C, when bridge C receives a BPDU from bridge D, from its blocked port B, it compares information on this received BPDU with its own BPDU information.

At bridge C, its own BPDU is updated by a BPDU sent via bridge D before disconnection of the above loop.

Therefore, bridge C receives a BPDU having root bridge information inferior to root bridge information possessed by blocked port B from representative port D of bridge D that is a representative bridge of blocked port B.

In this manner, bridge C judges that the bridge has received a BPDU inferior to that of the bridge C itself from bridge D. Thus, the bridge C itself is temporarily settled in a root bridge, and an operation for immediately opening its blocked port B that has received such inferior BPDU is performed, whereby its blocked port D is defined as representative port D.

Bridge C transmits its own BPDU from its representative port D to representative port D of bridge D, as shown in FIG. 6C.

When the BPDU from bridge C is received at its representative port D, bridge D compares information on the BPDU received from bridge C and that of the bridge D itself.

In this case, bridge D judges that the BPDU superior to the BPDU of the bridge D itself has been received at its representative port D. Thus, root bridge settlement is released, thereby disabling a root bridge.

Then, bridge D transmits a TCN-BPDU from its representative port D to representative port D of bridge C.

This TCN-BPDU from representative port D of bridge D is also transmitted to representative port D of bridge E.

Figure 6D:
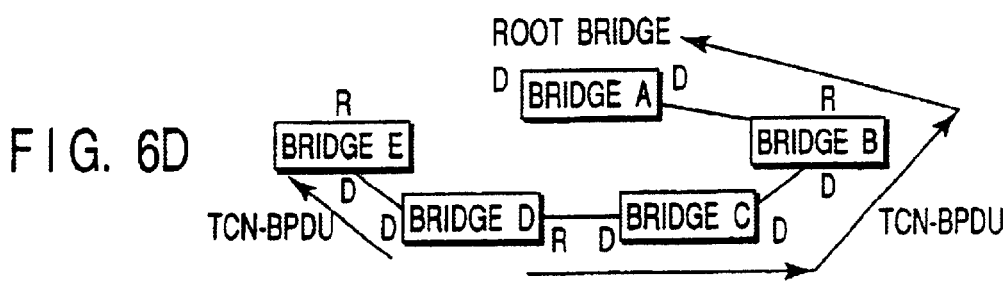
Figure 6E:
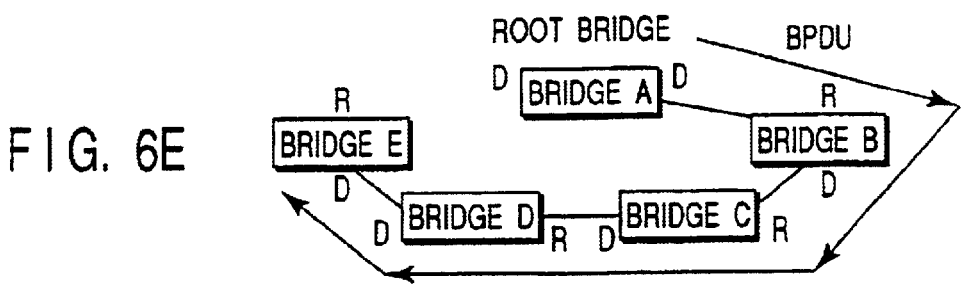
Figure 7:
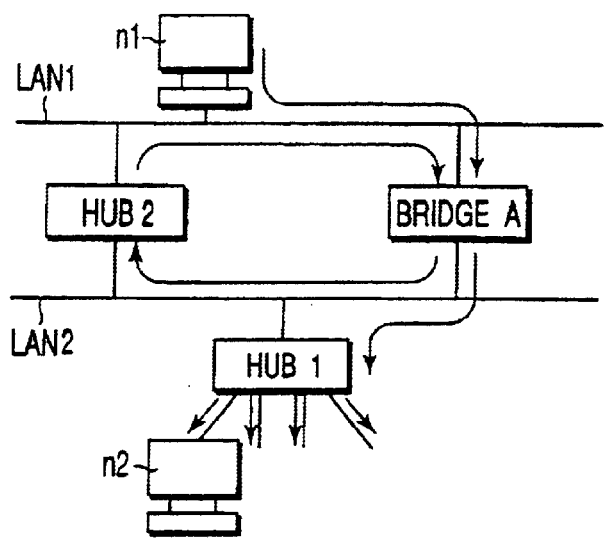
FIG. 7 is a view illustrating an object of a conventional spanning tree.
Figure 8:
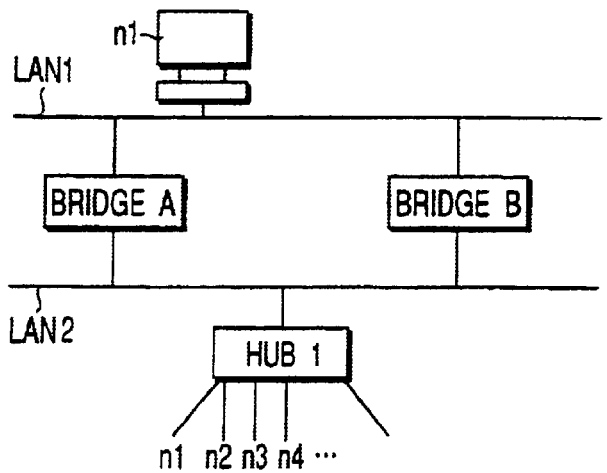
FIG. 8 is a view illustrating an object of a conventional spanning tree.
Figure 9:
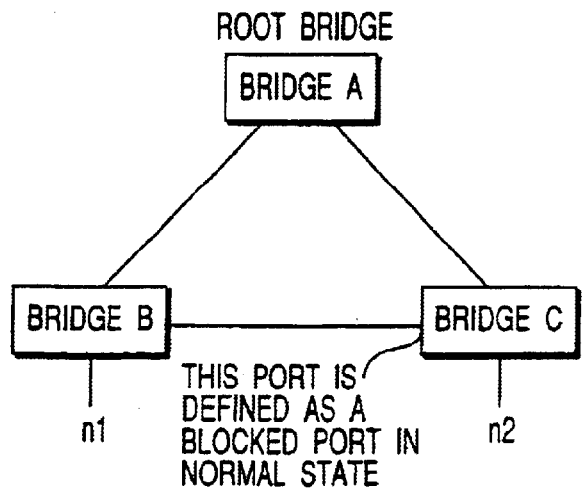
FIG. 9 is a view illustrating a conventional operation when a topology change occurs in a network using a spanning tree bridge.

When the TCN-BPDU from bridge D is received from its representative port D, bridge C transmits its TCN-BPDU to a representative port of bridge B, as shown in FIG. 6D.

At this time, when bridge C receives from root port R via bridge B a BPDU periodically transmitted from bridge A that has been a root bridge before disconnection of the above loop, root bridge settlement is released, thereby disabling a root bridge.

In this manner, bridge A that has been a root bridge before disconnection of the loop continuously serves as a root bridge.

Further, when a TCN-BPDU from bridge C is received at its representative port D, bridge B transmits its TCN-BPDU to representative port D of bridge A that is a root bridge.

That is, the TCN-BPDU transmitted from bridge D is transmitted to bridge A that is a root bridge via bridges C and B.

When bridge A receives a TCN-BPDU from bridge B, from representative port D, it transmits the TC detection flag set BPDU to root port R of bridge B, as shown in FIG. 6, in order to notify to each bridge that a topology changes.

When a TC detection flag set BPDU from bridge A is received at its root port R, bridge B transmits its BPDU to root port R of bridge C.

Further, when a TC detection flag set BPDU from bridge B is received at its root port R, bridge C transmits its BPDU to root port R of bridge D.

When a TC detection flag set BPDU from bridge C is received at its root port R, bridge D transmits its BPDU to root port R of bridge E.

That is, the TC flag set BPDUs transmitted from bridge A that is a root bridge are sequentially propagated to all other bridges B to E.

Then, each of the bridges B, C, D and E which has received the TC detection flag set BPDU deletes the contents of the forwarding table of each of their own.

In this way, each of the bridges B, C, D and E having the contents of its own forwarding table deleted therefrom generates a new forwarding table by the automatic learning function for address information that is one of the features of the spanning bridge.

That is, when communication is restarted, each bridge automatically learns a port of a bridge connected to a node issuing a packet by referring to the MAC address information of a packet sent, whereby the new forwarding table of each bridge is generated at a time when all the packets pass through each bridge.

As has been described above, in the spanning tree bridge 1 according to the present embodiment, when a root port link down is detected, topology change detection processing is performed in a way similar to that when a max age timer for clocking the validity of the BPDU has expired, and the spanning tree bridge 1 itself serves as a root bridge.

In addition, the spanning tree bridge 1 according to the present embodiment, in the case where a BPDU having root bridge information inferior to root bridge information possessed by a receiving port has been received, topology change detection processing is performed in a way similar to that when the max age timer has expired, and the spanning tree bridge 1 itself serves as a root bridge.

In the spanning tree bridge 1 according to the present embodiment, in the case where a root bridge is established as has been described above, a port that has been essentially a blocked port is changed to a forwarding state.

In addition, in the spanning tree bridge 1 according to the present embodiment, a bridge which has received a TCN-BPDU ignores a hold time, and propagates the TCN-BPDU immediately. If a root bridge is established, the bridge transmits the TC detection flag set BPDU to all ports immediately.

In the spanning tree bridge 1 according to the present embodiment, a bridge which has received a TC detection flag set BPDU, ignores a hold time, transmits such BPDU immediately, and then, deletes database information contained in the forwarding table immediately.

Therefore, according to the spanning tree bridge 1 of the present embodiment, in a network containing a redundant route caused by a plurality of bridges, cable reconnection, invalid port setting and communication route change caused by a communication failure can be performed immediately, and restoration from communication interrupt can be accelerated.

In the spanning tree bridge 1 according to the present embodiment, a description has been given by showing an example of a network configuration shown in FIG. 1 for clarity, this is not limited to the network configuration shown in FIG. 1.

That is, there can be employed a configuration of the spanning tree bridge 1 and a route change method according to the present embodiment relevant to a network containing a redundant route caused by a plurality of bridges, in other words, relevant to a spanning tree that operates by independent broadcast domain.

As is evident from the foregoing description, according to the present invention, in a network containing a redundant route caused by a plurality of bridges, cable reconnection, invalid port setting and communication route change caused by a communication failure can be performed immediately, and restoration from communication interrupt can be accelerated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spanning tree bridge having a predetermined algorithm and protocol which is employed in a network containing a redundant route caused by a plurality of spanning tree bridges having the same predetermined algorithm and protocol as each other, wherein one of the spanning tree bridges is settled in a root bridge, said spanning tree bridge comprising:

first detection means for detecting a link down of a root port that provides a shortest route to said root bridge;

second detection means for detecting a change of a representative bridge of a receiving port from information on Configuration Bridge Protocol Data Units (BPDU) received from another bridge;

means for, when the first detection means detects a link down of the root port, settling the spanning tree bridge itself in the root bridge;

means for, when a receiving port of the spanning tree bridge settled in the root bridge is a blocked port, and when one of (i) the first detection means detects a link down of the root port and (ii) the second detection means detects a change of the representative bridge, changing the blocked port to a forwarding state;

means for, when the spanning tree bridge itself is not settled in the root bridge and receives a BPDU from a representative port of a representative bridge of a receiving port inferior to its own BPDU, transmitting to another bridge a Topology Change Notification BPDU (TCN-BPDU) that the representative bridge has changed;

means for, when the spanning tree bridge itself is settled in the root bridge arid receives a TCN-BPDU from another bridge, transmitting to all other bridges a BPDU in which a Topology Change (TC) detection flag is set; and means for, when the spanning tree bridge itself is not settled in the root bridge and receives a BPDU in which the TC detection flag is set, transmitting the BPDU in a direction other than a root bridge direction, and deleting content of a forwarding table of the spinning tree bridge itself.

2. A spanning tree bridge having a predetermined algorithm and protocol which is employed in a network containing a redundant route caused by a plurality of spanning tree bridges having the same predetermined algorithm and protocol as each other, wherein one of the spanning tree bridges is settled in a root bridge, said spanning tree bridge comprising:

first detection means for detecting a link down of a root port that provides a shortest route to said root bridge;

second detection means for detecting a change of a representative bridge of a receiving port from information on Configuration Bridge Protocol Data Units (BPDU) received from another bridge;

means for, when one of (i) the first detection means detects a link down of the root port and (ii) the second detection means detects a change of the representative bridge, settling the spanning tree bridge itself in the root bridge;

means for, when a receiving port of the spanning tree bridge settled in the root bridge is a blocked port, and when one of (i) the first detection means detects a link down of the root port and (ii) the second detection means detects a change of the representative bridge, changing the blocked port to a forwarding state;

means for, when the spanning tree bridge itself is not settled in the root bridge and receives a BPDU from a representative port of a representative bridge of a receiving port inferior to its own BPDU, transmitting to another bridge a Topology Change Notification BPDU (TCN-BPDU) that the representative bridge has changed;

means for, when the spanning tree bridge itself is settled in the root bridge and receives a TCN-BPDU from another bridge, transmitting to all other bridges a BPDU in which a Topology Change (TC) detection flag is set; and means for, when the spanning tree bridge itself is not settled in the root bridge and receives a BPDU in which the TC detection flag is set, transmitting the BPDU in a direction other than a root bridge direction, and deleting content of a forwarding table of the spanning tree bridge itself.

3. A spanning tree bridge according to claim 2, further comprising means for, when the second detection means detects a change of the representative bridge, and when the spanning tree bridge settled in the root bridge receives a BPDU from another bridge superior to its own BPDU, setting the spanning tree bridge itself free of being settled in the root bridge.

4. A spanning tree bridge according to claim 2, further comprising means for, when the second detection means detects a change of the representative bridge, (i) when a port which has detected a change of the representative bridge is a root port, settling the spanning tree bridge itself in the root bridge, and (ii) when a port which has detected a change of the representative bridge is not a root port, setting the spanning tree bridge free of being settled in the root bridge.

5. A method for changing spanning tree bridge route for a spanning tree bridge having a predetermined algorithm and protocol which is employed in a network containing a redundant route caused by a plurality of spanning tree bridges having the same predetermined algorithm and protocol as each other, wherein one of the spanning tree bridges is settled in a root bridge, said method comprising:

detecting a link down of a root port that provides a shortest route to the root bridge;

detecting a change of a representative bridge of a receiving port from information on Configuration Bridge Protocol Data Units (BPDU);

when a link down of the root port is detected, settling the spanning tree bridge itself in the root bridge;

when a receiving port of the spanning tree bridge settled in the root bridge is a blocked port, and when a link down of the root port is detected, changing the blocked port to a forwarding state;

when the spanning tree bridge itself is not settled in the root bridge and receives a BPDU from a representative port of a representative bridge of a receiving port inferior to its own BPDU, transmitting to another bridge a Topology Change Notification BPDU (TCN-BPDU) that the representative bridge has changed;

when the spanning tree bridge itself is settled in the root bridge and receives a TCN-BPDU from another bridge, transmitting to all other bridges a BPDU in which a Topology Change (TC) detection flag is set; and when the spanning tree bridge itself is not settled in a spanning tree and receives a BPDU in which the TC detection flag is set, transmitting the BPDU in a direction other than a root bridge direction, and deleting content of a forwarding table of the spanning tree bridge itself.

6. A method for changing spanning tree bridge route for a spanning tree bridge having a predetermined algorithm and protocol which is employed in a network containing a redundant route caused by a plurality of spanning tree bridges having the same predetermined algorithm and protocol as each other, wherein one of the spanning tree bridges is settled in a root bridge, said method comprising:

detecting a link down of a root port that provides a shortest route to the root bridge;

detecting a change of a representative bridge of a receiving port from information on Configuration Bridge Protocol Data Units (BPDU);

when one of a link down of the root port and a change of the representative bridge is detected, settling the spanning tree bridge itself in the root bridge;

when a receiving port of the spanning tree bridge settled in the root bridge is a blocked port, and when a link down of the root port is detected, changing the blocked port to a forwarding state;

when the spanning tree bridge itself is not settled in the root bridge and receives a BPDU from a representative port of a representative bridge of a receiving port inferior to its own BPDU, transmitting to another bridge a Topology Change Notification BPDU (TCN-BPDU) that the representative bridge has changed;

when the spanning tree bridge itself is settled in the root bridge and receives a TCN-BPDU from another bridge, transmitting to all other bridges a BPDU in which a Topology Change (TC) detection flag is set; and when the spanning tree bridge itself is not settled in a spanning tree and receives a BPDU in which the TC detection flag is set, transmitting the BPDU in a direction other than a root bridge direction, and deleting content of a forwarding table of the spanning tree bridge itself.

7. A method according to claim 6, further comprising:

when a change of the representative bridge is detected, and when the spanning tree bridge itself settled in the root bridge receives a BPDU from another bridge superior to its own BPDU, setting the spanning tree bridge itself free of being settled in the root bridge.

8. A method according to claim 6, further comprising:

when a change of the representative bridge is detected, (i) when a port which has detected a change of the representative bridge is a root port, settling the spanning tree bridge itself in the root bridge, and (ii) when the port which has detected a change of the representative bridge is not a root port, setting the spanning tree bridge itself free of being settled in the root bridge.

* * * * *